(12) United States Patent
Ohi

(10) Patent No.: US 10,126,873 B2
(45) Date of Patent: Nov. 13, 2018

(54) STROKE CONTINUATION FOR DROPPED TOUCHES ON ELECTRONIC HANDWRITING DEVICES

(71) Applicant: Wacom Co., Ltd., Kazo-shi, Saitama (JP)

(72) Inventor: Charles Heart Ohi, Vancouver, WA (US)

(73) Assignee: Wacom Co., Ltd., Kazo-shi (JP)

( * ) Notice: Subject to any disclaimer, the term of this patent is extended or adjusted under 35 U.S.C. 154(b) by 106 days.

(21) Appl. No.: 15/192,763

(22) Filed: Jun. 24, 2016

(65) Prior Publication Data

US 2017/0371485 A1    Dec. 28, 2017

(51) Int. Cl.
*G06F 3/041*     (2006.01)
*G06F 3/0354*    (2013.01)
*G06K 9/22*      (2006.01)

(52) U.S. Cl.
CPC ........ *G06F 3/0418* (2013.01); *G06F 3/03545* (2013.01); *G06F 3/0414* (2013.01); *G06K 9/222* (2013.01); *G06F 2203/04104* (2013.01)

(58) Field of Classification Search
CPC .. G06F 17/242; G06F 3/0237; G06F 3/03545; G06F 3/0412; G06F 3/0414; G06F 3/0416; G06F 3/04883; G06F 2203/04104; G06F 2203/04106; G06K 9/00402; G06K 9/00416; G06K 9/222; G06K 9/30
See application file for complete search history.

(56) References Cited

U.S. PATENT DOCUMENTS

| | | | |
|---|---|---|---|
| 9,383,840 B2 * | 7/2016 | Seto | ........................ G06F 3/041 |
| 2010/0245275 A1 | 9/2010 | Tanaka | |
| 2011/0304643 A1 * | 12/2011 | Marison | .............. G06F 3/04883 |
| | | | 345/611 |
| 2016/0092021 A1 * | 3/2016 | Tu | ........................ G06F 3/0416 |
| | | | 345/173 |

OTHER PUBLICATIONS

"iOS SDK 2.0.12 Feb. 18, 2015 Release," Release Notes, Feb. 18, 2015, Version 2.0.12-1, 1 page.
Hinckley, K, et al., "Sensing Techniques for Tablet+Stylus Interaction," UIST '14, ACM [Association for Computing Machinery], Oct. 2014, 10 pages.

* cited by examiner

*Primary Examiner* — Nelson Rosario
(74) *Attorney, Agent, or Firm* — Christensen O'Connor Johnson Kindness PLLC

(57) ABSTRACT

An electronic handwriting device (e.g., a tablet device or smart phone) detects a first touch and a second touch (e.g., from a pen device) on or near a writing surface of the electronic handwriting device. The electronic handwriting device determines whether the first touch is a dropped touch. Upon determining that the first touch is a dropped touch, the electronic handwriting device applies data filtering to data that is potentially associated with the second touch. After the data filtering step, the electronic handwriting device determines whether to generate a stitching segment between a first line segment associated with the dropped touch and a second line segment associated with the second touch. The determination of whether to generate the stitching segment also may be based on other factors, such as the proximity of the second touch to the dropped touch.

26 Claims, 6 Drawing Sheets

STROKE CONTINUATION FOR DROPPED TOUCHES ON ELECTRONIC HANDWRITING DEVICES

BACKGROUND

Electronic handwriting is increasingly important and popular in a variety of contexts, such as electronic signatures for documents, electronic whiteboards, electronic document editing, note-taking, drawing, and the like. Many devices can be used for electronic handwriting. One technique that is gaining in popularity is using an electronic stylus to write on touch-sensitive devices, such as tablet computers. One problem that may occur when using an electronic stylus to write on a tablet computer is that the signal between the stylus and the tablet may be lost for brief intervals while writing. This loss of signal may result in the appearance of one or more small gaps within a stroke of handwriting even when the stylus has maintained contact with the tablet for the entire stroke. These gaps can reduce the quality of the rendered handwriting and the quality of the user's experience. Therefore, there is a need for improved methods to eliminate the appearance of such gaps in electronic handwriting.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, an electronic handwriting device (e.g., a tablet device or smart phone) detects a first touch and a second touch (e.g., from a pen device) on or near a writing surface of the electronic handwriting device. The electronic handwriting device determines whether the first touch is a dropped touch. Upon determining that the first touch is a dropped touch, the electronic handwriting device applies data filtering to data that is potentially associated with the second touch. Based at least in part on a result of the data filtering, the electronic handwriting device determines whether to generate a stitching segment between a first line segment associated with the dropped touch and a second line segment associated with the second touch. The stitching segment between the first and second line segments may connect these segments. The determination of whether to generate the stitching segment may be further based on other factors, such as the proximity of the second touch to the dropped touch. For example, a start point of the second touch can be identified after the data filtering, and the proximity of the second touch to the dropped touch can be determined by comparing a position of an end point of the dropped touch with the start point of the second touch.

Once a determination has been made to generate a stitching segment, the device can generate the first line segment associated with the dropped touch, the second line segment associated with the second touch, and the stitching segment, and render the segments for display as a continuous stroke. Or, the device can generate continuous single stroke data from the line segments (e.g., as a type of digital ink) by concatenating data of the first line segment, the second line segment, and the stitching segment, without necessarily displaying the continuous single stroke on the electronic handwriting device itself.

The determination of whether the first touch is a dropped touch may be based on analysis of pressure data associated with the first touch, such as a comparison of pressure data associated with an end point of the first touch with a threshold value. For example, if a pressure value associated with the end point of a first touch made by a pen device is greater than a specified threshold value, the electronic handwriting device may determine that the first touch did not end naturally by the pen device being lifted from the writing surface of an electronic handwriting device. The first touch may then be classified as a dropped touch.

Data filtering can be used to exclude potentially extraneous data associated with the second touch. Such data filtering may include, for example, applying a palm rejection algorithm to the data associated with the second touch, analyzing touch size associated with the second touch, or analyzing pressure data provided by a pressure-sensitive surface of the electronic handwriting device.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
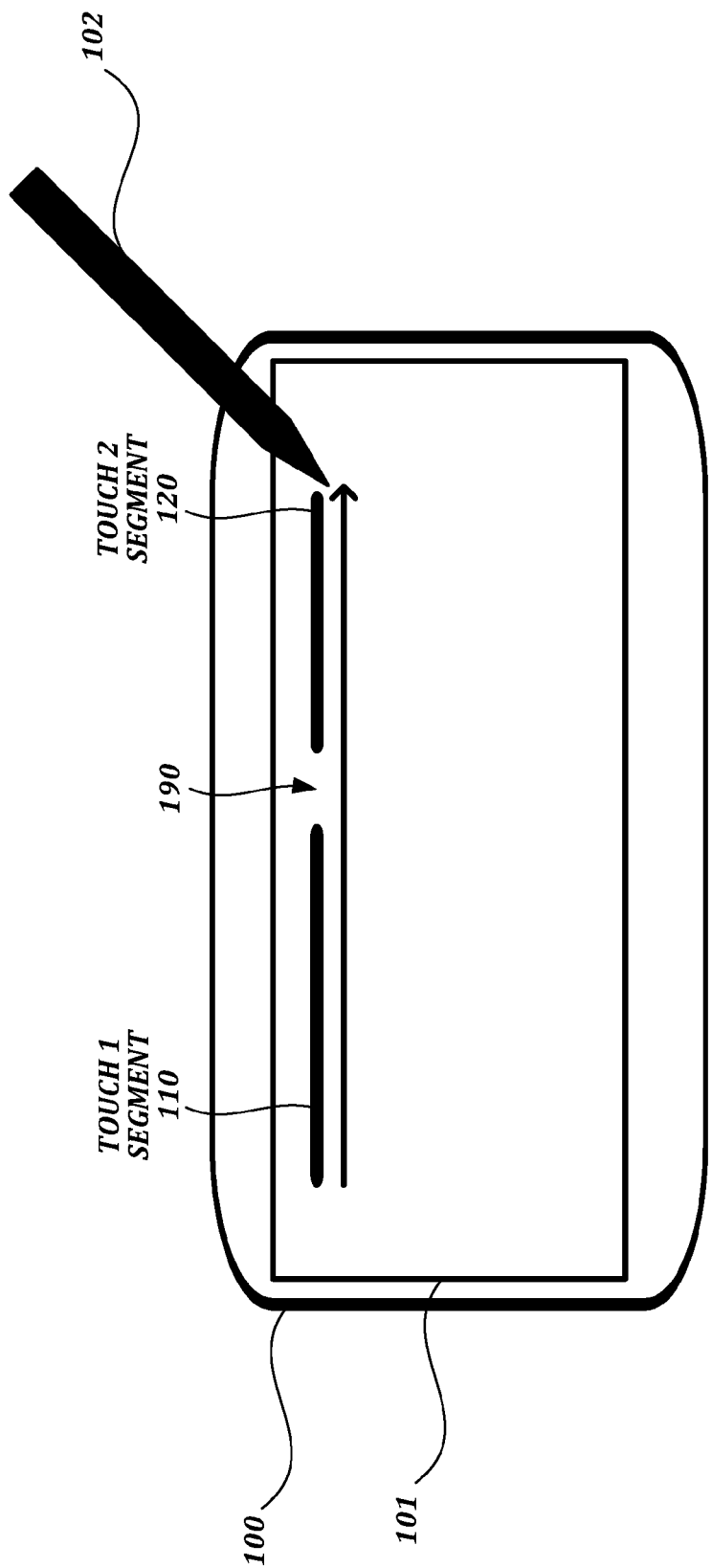
FIG. 1 is a diagram of an illustrative electronic handwriting system in which described embodiments may be implemented.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In the following description, numerous specific details are set forth in order to provide a thorough understanding of illustrative embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

I. Introduction

In electronic handwriting systems described herein, a "touch" is an event in which electronic handwriting input is detected (e.g., from a pen device). Electronic handwriting may involve one or more touches. In an illustrative scenario, when writing two words or characters, or when writing a character that requires separate pen strokes, a user may contact a writing surface of the electronic handwriting device (e.g., a tablet computer, touch-enabled smart phone, or other device configured to receive electronic handwriting input) with a pen device to begin a first touch. The user may then lift the pen device from the writing surface to end the first touch, and then contact the writing surface again to begin a second touch. Or, when writing a signature, the user may contact the writing surface to begin a single touch that ends when the pen device is lifted from the writing surface. The electronic handwriting device may then render the data associated with these touches for display as lines or other visual features corresponding to the handwriting.

However, because touches are often detected based on received data signals rather than physical contact, a detected touch may end prematurely when the signal is temporarily lost. This situation is referred to herein as a "dropped touch." Dropped touches may occur during a pen stroke, even when the pen device maintains physical contact with the writing surface of the electronic handwriting device for the duration of the stroke. Dropped touches can lead to line breaks or gaps due to missing data, and may degrade the quality of the displayed handwriting.

In embodiments described herein, an electronic handwriting system uses a stroke continuation technique in which analysis of non-positional data (e.g., pressure data) is used to detect a dropped touch on an electronic handwriting device, and further processing (e.g., data filtering) is used to determine whether to add a line segment to stitch together separate line segments that would otherwise result from the dropped touch. For example, if a pressure value associated with the end point of a first touch made by a pen device is greater than a specified threshold value, the electronic handwriting system may determine that the first touch did not end naturally by the pen device being lifted from the writing surface of an electronic handwriting device. The first touch may then be classified as a dropped touch. The electronic handwriting system then may apply one or more filtering techniques to data that may be associated with a second touch, to determine whether a stitching segment should be added to stitch together the line segment associated with the first touch and a line segment associated with the second touch.

As used herein, a "writing surface" of a device is used for handwriting, but need not be exclusively used for detecting handwriting. In an illustrative scenario, a writing surface may also be used for detecting other input, such as touch input from fingers, hands, etc. The writing surface also may serve other purposes besides detecting input. In an illustrative scenario, the writing surface is also a display. A writing surface of a device may be pressure sensitive, but this is not required.

FIG. 1 is a diagram of an illustrative electronic handwriting system in which described embodiments may be implemented. In the example shown in FIG. 1, a tablet device 100 (e.g., a suitably configured iPad® or iPad Air® tablet computer, available from Apple Inc.) includes a capacitive screen 101 that may display, for example, a user interface that accepts input from a pen device 102. The pen device 102 (e.g., a Bamboo™ stylus, available from Wacom Co., Ltd.) acts as a capacitive stylus and also communicates with the tablet device 100 using a suitable wireless communication protocol, such as Bluetooth. This allows the pen device 102 to provide both positional information (e.g., x/y coordinates) and non-positional information, such as pressure data, to the tablet device 100. Pressure data can be provided via a pressure sensor. In the example shown in FIG. 1, a pressure-sensitive tip and associated pressure sensor (not shown) of the pen device 102 can detect changes in pen pressure and provide pressure data that can be transmitted wirelessly (e.g., via Bluetooth) to the tablet device 100. In some embodiments, the tablet device itself may also provide pressure data with its own pressure sensors (not shown), as may be provided with a pressure-sensitive display.

Alternatively, other technology may be used for handwriting input. For example, the system shown in FIG. 1 may use electromagnetic resonance (EMR) technology, in which a digitizer incorporates a sensor board that detects the pen's movement, and energy is induced in the pen's resonant circuit by a magnetic field generated by the sensor board surface. The pen's resonant circuit then makes use of this energy to return a magnetic signal to the sensor board surface. The board detects the pen's coordinate position at regular time intervals even if the electronic pen does not touch the sensor board surface, so long as the pen remains within close enough proximity to the sensor board, such that signals can still be received from the pen. (The effective signal range can vary depending on the particular technology being used, but is generally on the order of several millimeters.)

However the handwriting data may be collected, pen event information typically includes the x/y position of the pen-tip on or above the surface on which the writing is made. In addition to x/y-coordinate values, pen event information may include additional information such as pressure (pen force), angles (azimuth, altitude, and/or rotation) and pen-down status. Pen event information is typically collected at regular intervals during a writing process. The sampling rates at which pen event information may be collected may vary depending on system design and configuration.

Referring again to the example shown in FIG. 1, the tablet device 100 detects a first touch ("Touch 1") and a second touch ("Touch 2") in a single pen stroke that follows a path represented by the rightward-pointing arrow. The starting point of the first touch may be detected on contact with the writing surface, or when the pen device comes near enough to the writing surface that the signal is detected. These touches are rendered as a first line segment 110 corresponding to Touch 1 and a second line segment 120 corresponding to Touch 2, with a gap 190 between the line segments. The gap 190 appears because Touch 1 was prematurely dropped (e.g., due to a temporary loss of data provided via the Bluetooth connection) during the pen stroke. Touch 2 is detected when pen data is received again during the same pen stroke. Although these touches are identified herein as "Touch 1" and "Touch 2" for ease of discussion, in some embodiments, different touches may be associated with different unique identifiers. Although two touches are shown, it should be understood that additional touches may be detected, such as where touches are repeatedly detected and dropped in the same stroke. The techniques described herein can be applied to more than two touches, including multiple dropped touches in the same stroke.

II. Illustrative Embodiments

In this section, illustrative embodiments are described in which an electronic handwriting system uses a stroke continuation technique in which analysis of non-positional data (e.g., pressure data) is used to detect a dropped touch on an electronic handwriting device, and determines whether to add a line segment to stitch together the separate line segments that would otherwise result from the dropped touch.

Figure 2A:
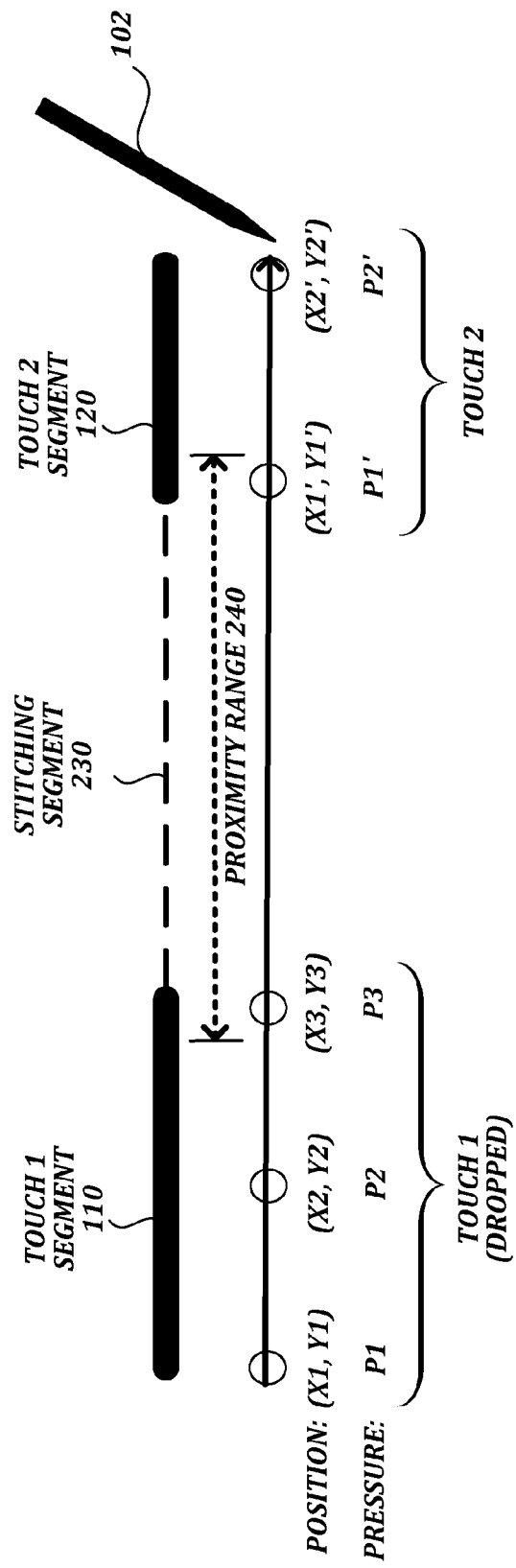
FIGS. 2A, 2B, and 3 are diagrams of lines drawn by a pen device in which a stitching segment is generated to stitch together a broken line resulting from a dropped touch, according to various embodiments of the present disclosure.

FIG. 2A is a diagram of a line drawn by a pen device (and associated data points) in which a stitching segment is generated to stitch together a broken line that would otherwise result from the dropped touch depicted in FIG. 1. In the example shown in FIG. 2A, five illustrative pen events are represented by circles positioned along the path of the pen stroke, each with corresponding position ((X1, Y1), (X2, Y2), etc.) and pressure data (P1, P2, etc.) The end point of Touch 1 is at position (X3, Y3), with a corresponding pressure value P3 provided by the pen device 102. The dropped touch is detected based on analysis of non-positional data. In this example, the dropped touch is detected by determining whether pressure value P3 at the end point of Touch 1 is greater than a threshold level. Typically, a natural end to Touch 1, in which the pen device is lifted from the writing surface of the tablet device, would include a pressure level of zero, or near zero, at the end of the Touch 1. Therefore, in this example the threshold pressure level to detect a dropped touch is greater than zero, and may be two or more discrete pressure levels greater than zero. The particular threshold pressure level to be used may depend on factors such as device capabilities (e.g., number of available pressure levels) and desired levels of sensitivity. Illustrative numbers of pressure levels that may be provided by the pen device 102 include 512, 1024, and 2048 pressure levels. It should be understood that other numbers of pressure levels also may be provided.

In this example, if the pressure level at the end point of Touch 1 exceeds the threshold, the electronic handwriting system determines that a dropped touch has occurred. The electronic handwriting system then determines whether to generate a line segment to stitch together the separate line segments that would otherwise result from the dropped touch. In the example shown in FIG. 2A, the electronic handwriting system compares the position of the start point of Touch 2 (X1', Y1') with the end point of Touch 1 (X3, Y3) to determine whether the start point of Touch 2 is within a predetermined proximity range 240. Often, if a touch is dropped in the middle of a pen stroke, a new touch will be initiated within close proximity of the end point of the dropped touch (e.g., when the connection between the pen device 102 and the tablet is reestablished), but not instantaneously. Therefore, the proximity range 240 in this example is set to be greater than zero, but shorter than a typical stroke length. The particular proximity range to be used may depend on factors such as device capabilities (e.g., sampling rates at which pen event information may be collected), an expected average pen velocity, or desired levels of sensitivity. For example, devices with higher sampling rates (providing more pen events during given time period) may use smaller proximity ranges, while devices with lower sampling rates (providing fewer pen events during given time period) may use larger proximity ranges.

In the example shown in FIG. 2A, after the electronic handwriting system detects a dropped touch, it finds the start point of Touch 2 to be within the proximity range 240. Therefore, the electronic handwriting system determines that Touch 1 and Touch 2 are likely part of the same stroke and generates a stitching segment 230 to stitch together line segments 110, 120 associated with Touch 1 and Touch 2, respectively. Although the stitching segment 230 is represented with a dashed line for ease of illustration, it should be understood that the stitch segment may be rendered, in its pattern, thickness and other visual qualities, to blend seamlessly with other line segments for improved quality of the displayed electronic handwriting.

Other types of analysis may be used to determine whether to generate a stitching segment between a dropped touch and a subsequent touch, in addition to or in place of proximity analysis. For example, the electronic handwriting system may determine whether the direction of the stroke at the end of Touch 1 and the beginning of Touch 2 is similar (e.g., within a predefined angle threshold), to help determine whether to generate a stitching segment. If the direction of the stroke at these points is significantly different (e.g., if they are in opposite directions or at right angles to one another), the electronic handwriting system may determine that the touches are likely not part of the same stroke, and not generate a stitching segment. As another example, the electronic handwriting system may determine whether the pressure of the stroke in Touch 1 and Touch 2 is similar (e.g., within a predefined pressure value threshold), to help determine whether to generate a stitching segment. If the pressure at these points is significantly different, the electronic handwriting system may determine that the touches are likely not part of the same stroke, and not generate a stitching segment. As another example, data filtering can be used to exclude potentially extraneous data associated with Touch 2, as described in further detail below.

Figure 2B:
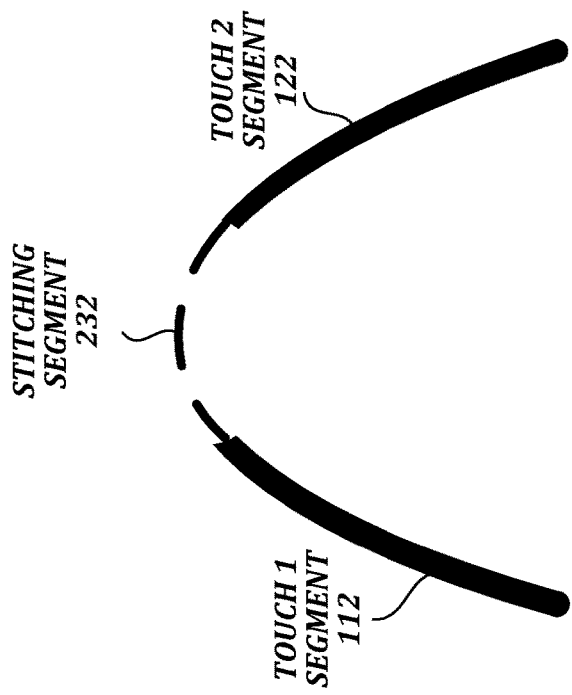

Although the stitching segment 230 shown in FIG. 2A is a straight line segment, other shapes are also possible for stitching segments. FIG. 2B is a diagram of a line drawn by a pen device in which a curved stitching segment 232 is interpolated from the paths of segments 112 and 122. Alternatively, the stitching segment 232 also may be generated as a straight line between the end point of segment 112 and the start point of segment 122, rather than a curved line, for ease of calculation.

Figure 3:
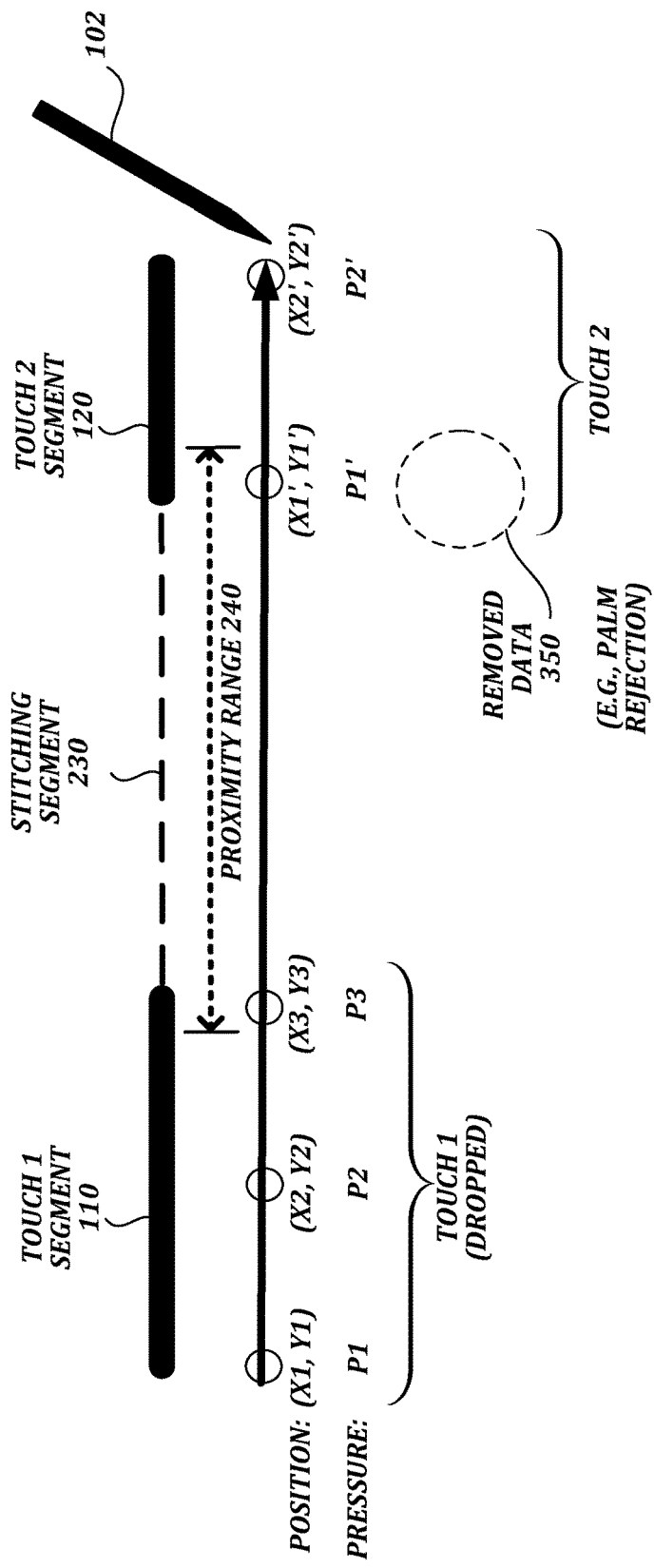

FIG. 3 is another diagram of a line drawn by a pen device (and associated data points) in which a stitching segment is generated to stitch together a broken line that would otherwise result from the dropped touch depicted in FIG. 1. As in FIG. 2A, the line is drawn in a single pen stroke, and five illustrative pen events are represented by circles positioned along the arrow, each with corresponding position ((X1, Y1), (X2, Y2), etc.) and pressure data (P1, P2, etc.). In the example shown in FIG. 3, additional touch data is generated when a user's hand contacts the writing surface of the electronic handwriting device. The additional touch data may be initially associated with Touch 2.

In the example shown in FIG. 3, the electronic handwriting system applies data filtering to data that is potentially associated with Touch 2. The data filtering allows the electronic handwriting system to remove data from consideration if it is not likely to be part of the same pen stroke as Touch 1, before performing any proximity analysis. As shown in FIG. 3, the electronic handwriting system removes data 350 from consideration even though at least some of the removed data may have been within the proximity range 240.

Some types of data filtering may allow the electronic handwriting system to determine whether the additional data 350 associated with Touch 2 has likely been produced by the pen device 102 or by some other object, such as the user's hand. Such data filtering may involve application of a palm rejection algorithm. Palm rejection algorithms can help to distinguish between unintentional touches (e.g., touches made by a palm or heel of a hand while writing) and intentional touches. Palm rejection algorithms may be particularly useful for touch-enabled tablet computers or smart phones that are capable of detecting touch input from fingers, hands, and the like, in addition to pen or stylus input. The details of the palm rejection algorithm may vary depending on implementation, and may take into account factors such as touch size, density or orientation of touch points, speed of movement, the timing at which touch points appear, and the like, in order to distinguish between unintentional and unintentional touches.

Alternatively, other forms of data filtering (e.g., based on touch size comparison or pressure data from the writing surface of the electronic handwriting device) can be applied to data associated with Touch 2. For example, if the difference in touch size of Touch 1 and data associated with Touch 2 is greater than a predetermined value, it is less likely that Touch 1 and Touch 2 are part of the same pen stroke, and the data associated with Touch 2 can be filtered out before proceeding with the line stitching process. (A comparison of touch sizes can be performed independent of any palm rejection algorithm.) As another example, if the difference between pressure data associated with Touch 1 and pressure data associated with Touch 2 is greater than a predetermined value, it is less likely that Touch 1 and Touch 2 are part of the same pen stroke, and the data associated with Touch 2 can be filtered out. As another example, accelerometer data from a suitably configured pen device can be analyzed to determine whether Touch 1 and Touch 2 are part of the same pen stroke. A difference between accelerometer data associated with Touch 1 and Touch 2 that is greater than a predetermined value may indicate that it is less likely that Touch 1 and Touch 2 are part of the same pen stroke.

Referring again to FIG. 3, after removal of the data 350, the electronic handwriting system can perform further processing of any remaining data that may be associated with Touch 2. For example, the electronic handwriting system can detect a start point for Touch 2 and apply proximity analysis to the remaining data associated with Touch 2. In the example shown in FIG. 3, the electronic handwriting system compares the position of the start point of Touch 2 (X1', Y1') with the end point of Touch 1 (X3, Y3) to determine whether the start point of Touch 2 is within a predetermined proximity range 240. If the start point of Touch 2 is found to be within the proximity range 240, the electronic handwriting system determines that Touch 1 and Touch 2 are part of the same stroke and generates a stitching segment 230 to stitch together the line segments 110, 120 associated with Touch 1 and Touch 2, respectively.

In some cases, data filtering may make proximity analysis unnecessary. For example, if there is no data remaining for Touch 2 after data filtering is performed, it is not necessary to perform any proximity analysis between Touch 1 and Touch 2.

Although only two touches are shown in FIGS. 2A, 2B, and 3 for ease of illustration, it should be understood that three or more touches also can be processed in accordance with principles described herein. For example, referring again to the examples shown in FIGS. 2A, 2B, and 3, an additional touch may be detected between Touch 1 and Touch 2, with the potential for generating two or more stitching segments to connect the three touches. The processing described herein may be performed between pairs of nearest neighboring touches, between pairs of touches that are within a particular range, among groups of more than two touches, or on some other basis. In one possible scenario involving three touches, if the first touch is a dropped touch, and all data associated with the second touch is removed by data filtering, additional processing can be performed to determine whether to generate a stitching segment to connect the first touch with the third touch.

Figure 4:
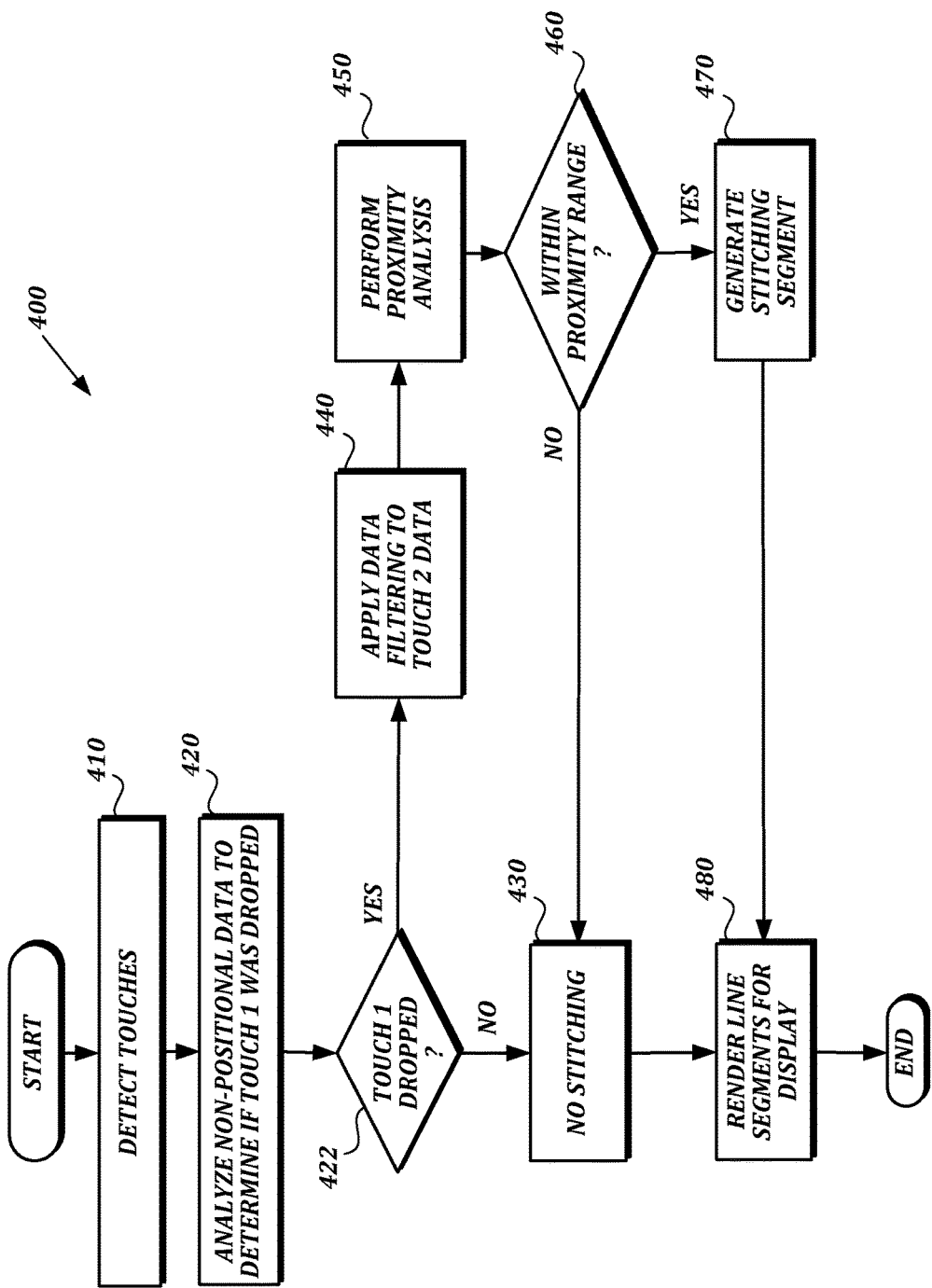
FIG. 4 is a flow diagram of an illustrative line stitching process that may be implemented by an electronic handwriting system, according to at least one embodiment of the present disclosure.

FIG. 4 is a flow diagram of an illustrative process 400 that may be implemented by an electronic handwriting system such as the system shown in FIG. 1. In the example shown in FIG. 4, the system detects multiple touches at step 410 and analyzes non-positional data (e.g., pressure data) at step 420. The system uses the result of this analysis to determine if a first touch was dropped at step 422. If the first touch was not dropped, no stitching is performed (step 430). If the first touch was dropped, at step 440 the system applies data filtering to data that is potentially associated with a second touch. After data filtering, the system performs proximity analysis at step 450 for any remaining data associated with the second touch. For example, the system may determine whether the end point of the dropped touch and the start point of the second touch (e.g., after data filtering) are within a predetermined spatial range of one another. (If no data associated with the second touch remains after data filtering, the proximity analysis may be omitted.) If the dropped touch and the second touch are within the proximity range (step 460), the system generates a stitching segment at step 470. Alternatively, other conditions can be used in place of or in combination with the proximity analysis to determine whether to generate a stitching segment. For example, the system may determine whether a pressure value of the end point of the dropped touch (e.g., pressure value P3 in FIG. 2A) is within a predefined threshold range of a pressure value of the start point of the second touch (e.g., pressure value P1' in FIG. 2A), to help determine whether to generate a stitching segment.

The stitching segment can be used to connect line segments corresponding to the dropped touch and the second touch. In the example shown in FIG. 4, if the dropped touch and the second touch are not within the proximity range, no stitching is performed. After the determinations have been made with regard to possible generation of stitching segments, the system renders line segments (including any stitching segments) for display at step 480. The rendered line segments can be displayed on an electronic handwriting device. Or, the system can generate continuous single stroke data comprising coordinate data and other pen data from the line segments (e.g., as a type of digital ink) by concatenating data of the first line segment, the second line segment, and the stitching segment, without necessarily displaying the continuous single stroke on the electronic handwriting device itself. The continuous single stroke data can instead be stored for later processing or displayed on some other device, such as a host PC in communication with the electronic handwriting device.

The process 400 shown in FIG. 4 can be repeated for additional touches. The process shown in FIG. 4 can end after all touches have been processed in this way, or at some other point. The process 400 need not be performed for all handwriting input. For example, if only one touch is detected, the process 400 can be omitted. As another example, if a second touch occurs after a predetermined length of time since a first touch, the process 400 can be omitted on the assumption that even if the first touch was dropped, the second touch is unlikely to be associated with the same pen stroke due to the length of time between touches.

III. Computing Environment

Unless otherwise specified in the context of specific examples, the embodiments described herein, or other embodiments, may be implemented by any suitable computing devices, including, but not limited to, laptop computers, desktop computers, smart phones, tablet computers, dedicated signature tablets, or combinations of such devices.

Figure 5:
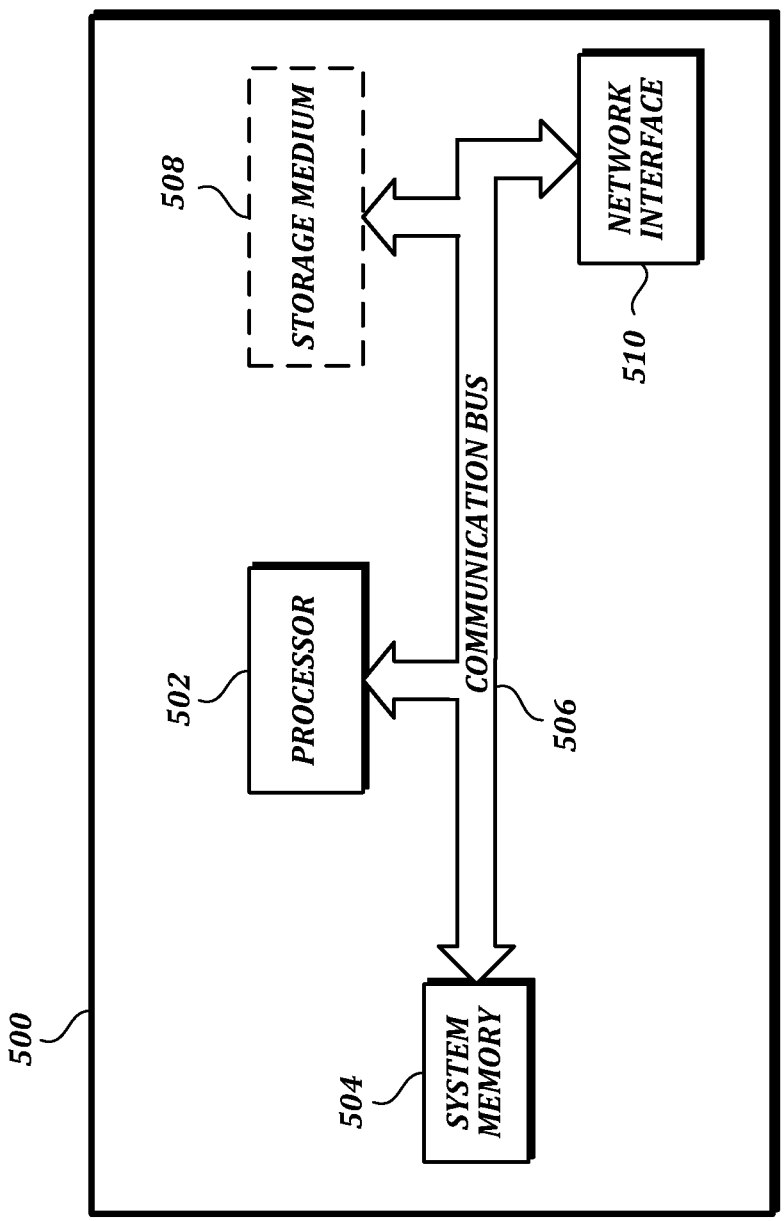
FIG. 5 is a block diagram that illustrates aspects of an illustrative computing device appropriate for use in accordance with embodiments of the present disclosure.

FIG. 5 is a block diagram that illustrates aspects of an illustrative computing device 500 appropriate for use in accordance with embodiments of the present disclosure. The description below is applicable to servers, personal computers, mobile phones, smart phones, tablet computers, embedded computing devices, and other currently available or yet to be developed devices that may be used in accordance with embodiments of the present disclosure.

In its most basic configuration, the computing device 500 includes at least one processor 502 and a system memory 504 connected by a communication bus 506. Depending on the exact configuration and type of device, the system memory 504 may be volatile or nonvolatile memory, such as read only memory ("ROM"), random access memory ("RAM"), EEPROM, flash memory, or other memory technology. Those of ordinary skill in the art and others will recognize that system memory 504 typically stores data and/or program modules that are immediately accessible to and/or currently being operated on by the processor 502. In this regard, the processor 502 may serve as a computational center of the computing device 500 by supporting the execution of instructions.

As further illustrated in FIG. 5, the computing device 500 may include a network interface 510 comprising one or more components for communicating with other devices over a network. Embodiments of the present disclosure may access basic services that utilize the network interface 510 to perform communications using common network protocols. The network interface 510 may also include a wireless network interface configured to communicate via one or more wireless communication protocols, such as WiFi, 2G, 3G, 4G, LTE, WiMAX, Bluetooth, and/or the like.

In the illustrative embodiment depicted in FIG. 5, the computing device 500 also includes a storage medium 508. However, services may be accessed using a computing device that does not include means for persisting data to a local storage medium. Therefore, the storage medium 508 depicted in FIG. 5 is optional. In any event, the storage medium 508 may be volatile or nonvolatile, removable or non-removable, implemented using any technology capable of storing information such as, but not limited to, a hard drive, solid state drive, CD-ROM, DVD, or other disk storage, magnetic tape, magnetic disk storage, and/or the like.

As used herein, the term "computer readable medium" includes volatile and nonvolatile and removable and non-removable media implemented in any method or technology capable of storing information, such as computer readable instructions, data structures, program modules, or other data. In this regard, the system memory 504 and storage medium 508 depicted in FIG. 5 are examples of computer readable media.

For ease of illustration and because it is not important for an understanding of the claimed subject matter, FIG. 5 does not show some of the typical components of many computing devices. In this regard, the computing device 500 may include input devices, such as a keyboard, keypad, mouse, trackball, microphone, video camera, touchpad, touchscreen, stylus, and/or the like. Such input devices may be coupled to the computing device 500 by wired or wireless connections including RF, infrared, serial, parallel, Bluetooth, USB, or other suitable connection protocols using wireless or physical connections.

In any of the described examples, data can be captured by input devices and transmitted or stored for future processing. The processing may include encoding data, which can be subsequently decoded for presentation by output devices. Input devices can be separate from and communicatively coupled to computing device 500, or can be integral components of the computing device 500. The computing device 500 may also include output devices such as a display or touchscreen. The output devices can be separate from and communicatively coupled to the computing device 500, or can be integral components of the computing device 500. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, Python, Ruby, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub modules. The computing logic can be stored in any type of computer readable medium (e.g., a non-transitory medium such as a memory or storage medium) or computer storage device and be stored on and executed by one or more general purpose or special purpose processors, thus creating a special purpose computing device configured to provide functionality described herein.

IV. Extensions and Alternatives

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A computer-implemented method comprising:
   detecting a first touch and a second touch on or near a writing surface of an electronic handwriting device;
   by the electronic handwriting device, determining whether the first touch is a dropped touch in which the first touch ends prematurely when a data signal associated with the first touch is temporarily lost;
   by the electronic handwriting device, upon determining that the first touch is a dropped touch, applying data filtering to data associated with the second touch; and
   by the electronic handwriting device, based at least in part on a result of the application of data filtering to the data associated with the second touch, determining whether to generate a stitching segment between a first line segment associated with the first touch and a second line segment associated with the second touch, wherein determining whether to generate the stitching segment is further based on proximity of the second touch to the first touch, wherein a start point of the second touch is identified after the data filtering, and wherein the proximity of the second touch to the first touch is determined by comparing a position of an end point of the first touch with the start point of the second touch.

2. The method of claim 1, wherein determining whether the first touch is a dropped touch is based at least in part on analysis of pressure data associated with the first touch.

3. The method of claim 1, wherein determining whether the first touch is a dropped touch comprises comparing pressure data associated with an end point of the first touch with a threshold value.

4. The method of claim 1, wherein the data filtering comprises applying a palm rejection algorithm to the data associated with the second touch.

5. The method of claim 1, wherein the data filtering comprises analysis of touch size associated with at least the second touch.

6. The method of claim 1, wherein the data filtering comprises analysis of pressure data provided by the writing surface of the electronic handwriting device.

7. The method of claim 1, further comprising:
   generating the first line segment associated with the first touch, the second line segment associated with the second touch, and the stitching segment; and
   rendering the first line segment, the second line segment, and the stitching segment for display as a continuous stroke.

8. The method of claim 1, further comprising:
   generating the first line segment associated with the first touch, the second line segment associated with the second touch, and the stitching segment; and
   generating continuous single stroke data by concatenating data of the first line segment, the second line segment, and the stitching segment.

9. An electronic handwriting device comprising a processor, memory, and a writing surface, the computing device being programmed to perform functions comprising:
   detecting a first touch and a second touch on or near the writing surface of the electronic handwriting device;
   determining whether the first touch is a dropped touch in which the first touch ends prematurely when a data signal associated with the first touch is temporarily lost;
   upon determining that the first touch is a dropped touch, applying data filtering to data associated with the second touch; and
   based at least in part on a result of the application of data filtering to the data associated with the second touch, determining whether to generate a stitching segment between a first line segment associated with the first touch and a second line segment associated with the second touch, wherein determining whether to generate the stitching segment is further based on proximity of the second touch to the first touch, wherein a start point of the second touch is identified after the data filtering, and wherein the proximity of the second touch to the first touch is determined by comparing a position of an end point of the first touch with the start point of the second touch.

10. The electronic handwriting device of claim 9, wherein determining whether the first touch is a dropped touch is based at least in part on analysis of pressure data associated with the first touch.

11. The electronic handwriting device of claim 9, wherein determining whether the first touch is a dropped touch comprises comparing pressure data associated with an end point of the first touch with a threshold value.

12. The electronic handwriting device of claim 9, wherein the data filtering comprises applying a palm rejection algorithm to the data associated with the second touch.

13. The electronic handwriting device of claim 9, wherein the data filtering comprises analysis of touch size associated with at least the second touch or analysis of pressure data provided by a the writing surface of the electronic handwriting device.

14. The electronic handwriting device of claim 9, wherein the computing device is further programmed to perform functions comprising:
   generating the first line segment associated with the first touch, the second line segment associated with the second touch, and the stitching segment; and
   rendering the first line segment, the second line segment, and the stitching segment for display as a continuous stroke.

15. The electronic handwriting device of claim 9, wherein the electronic handwriting device is a tablet device or a smart phone.

16. One or more non-transitory computer readable media having stored therein computer-readable instructions, including instructions configured to cause an electronic handwriting device to:

detect a first touch and a second touch at a writing surface of the electronic handwriting device;

determine whether the first touch is a dropped touch in which the first touch ends prematurely when a data signal associated with the first touch is temporarily lost;

upon determining that the first touch is a dropped touch, apply data filtering to data associated with the second touch; and based at least in part on a result of the application of data filtering to the data associated with the second touch, determine whether to generate a stitching segment between a first line segment associated with the first touch and a second line segment associated with the second touch, wherein determining whether to generate the stitching segment is further based on proximity of the second touch to the first touch, wherein a start point of the second touch is identified after the data filtering, and wherein the proximity of the second touch to the first touch is determined by comparing a position of an end point of the first touch with the start point of the second touch.

17. A computer-implemented method comprising:

detecting a first touch and a second touch on or near a writing surface of an electronic handwriting device;

by the electronic handwriting device, determining whether the first touch is a dropped touch in which the first touch ends prematurely when a data signal associated with the first touch is temporarily lost;

by the electronic handwriting device, upon determining that the first touch is a dropped touch, applying data filtering to data associated with the second touch, wherein the data filtering comprises applying a palm rejection algorithm to the data associated with the second touch; and by the electronic handwriting device, based at least in part on a result of the application of data filtering to the data associated with the second touch, determining whether to generate a stitching segment between a first line segment associated with the first touch and a second line segment associated with the second touch.

18. The method of claim 17, wherein determining whether to generate the stitching segment is further based on proximity of the second touch to the first touch.

19. The method of claim 18, wherein a start point of the second touch is identified after the data filtering, and wherein the proximity of the second touch to the first touch is determined by comparing a position of an end point of the first touch with the start point of the second touch.

20. The method of claim 17, wherein determining whether the first touch is a dropped touch is based at least in part on analysis of pressure data associated with the first touch.

21. The method of claim 17, wherein determining whether the first touch is a dropped touch comprises comparing pressure data associated with an end point of the first touch with a threshold value.

22. The method of claim 17, wherein the data filtering further comprises analysis of touch size associated with at least the second touch.

23. The method of claim 17, wherein the data filtering further comprises analysis of pressure data provided by the writing surface of the electronic handwriting device.

24. The method of claim 17, further comprising:

generating the first line segment associated with the first touch, the second line segment associated with the second touch, and the stitching segment; and rendering the first line segment, the second line segment, and the stitching segment for display as a continuous stroke.

25. The method of claim 17, further comprising:

generating the first line segment associated with the first touch, the second line segment associated with the second touch, and the stitching segment; and generating continuous single stroke data by concatenating data of the first line segment, the second line segment, and the stitching segment.

26. An electronic handwriting device comprising a processor, memory, and a writing surface, the computing device being programmed to perform functions comprising:

detecting a first touch and a second touch on or near the writing surface of the electronic handwriting device;

determining whether the first touch is a dropped touch in which the first touch ends prematurely when a data signal associated with the first touch is temporarily lost;

upon determining that the first touch is a dropped touch, applying data filtering to data associated with the second touch, wherein the data filtering comprises applying a palm rejection algorithm to the data associated with the second touch; and based at least in part on a result of the application of data filtering to the data associated with the second touch, determining whether to generate a stitching segment between a first line segment associated with the first touch and a second line segment associated with the second touch.

* * * * *

UNITED STATES PATENT AND TRADEMARK OFFICE
CERTIFICATE OF CORRECTION

PATENT NO. : 10,126,873 B2
APPLICATION NO. : 15/192763
DATED : November 13, 2018
INVENTOR(S) : C. H. Ohi Page 1 of 1

It is certified that error appears in the above-identified patent and that said Letters Patent is hereby corrected as shown below:

In the Claims

| Column | Line | |
|---|---|---|
| 12 (Claim 13, Line 4) | 50 | "by a the writing" should read --by the writing-- |

Signed and Sealed this
Thirtieth Day of July, 2019

Andrei Iancu
*Director of the United States Patent and Trademark Office*